US006242162B1

United States Patent
Ro et al.

(10) Patent No.: US 6,242,162 B1
(45) Date of Patent: *Jun. 5, 2001

(54) MANUFACTURING METHOD OF A MASTER DISK FOR FORMING AN OPTICAL DISK, AND THE MASTER DISK

(75) Inventors: Myong-do Ro; Young-man Ahn; Chang-min Park, all of Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/073,761

(22) Filed: May 7, 1998

(30) Foreign Application Priority Data

Oct. 8, 1997 (KR) .................................................. 97-51669

(51) Int. Cl.[7] .................................................... G03F 7/26
(52) U.S. Cl. ......................... 430/321; 430/320; 430/945; 430/394; 309/275.4
(58) Field of Search ..................................... 430/320, 321, 430/945, 394; 369/275.3, 275.4, 277

(56) References Cited

U.S. PATENT DOCUMENTS

| 3,894,179 | * | 7/1975 | Jacobs et al. | 430/945 |
|---|---|---|---|---|
| 4,307,178 | * | 12/1981 | Kaplan et al. | 430/325 |
| 4,724,043 | * | 2/1988 | Bergendahl et al. | 430/321 |
| 5,147,763 | * | 9/1992 | Kamikahara | 430/320 |
| 5,149,607 | * | 9/1992 | DeGraaf et al. | 430/321 |
| 5,286,583 | * | 2/1994 | Hirokane et al. | 430/321 |
| 5,471,455 | | 11/1995 | Jabr | 369/107 |
| 5,645,978 | | 7/1997 | Inui et al. | 430/321 |
| 5,799,007 | * | 8/1998 | Lee et al. | 369/275.4 |
| 5,898,553 | * | 4/1999 | Oyanagi et al. | 360/135 |
| 5,917,799 | * | 6/1999 | Nakada et al. | 360/110 |
| 6,071,586 | * | 6/2000 | Ro et al. | 430/321 |

FOREIGN PATENT DOCUMENTS

| 0539686A | 5/1993 | (EP) . | |
|---|---|---|---|
| 0596439A | 11/1994 | (EP) . | |
| 2159299A | 11/1985 | (GB) . | |
| 55-101144 | * 8/1980 | (JP) . | |
| 5-120734 | * 5/1993 | (JP) | ................................ 369/275.4 |
| 8-241541 | 9/1996 | (JP) . | |

OTHER PUBLICATIONS

Abstract of JP 08–241541, Sep. 22, 1996.*
Merck Index tenth Ed. pp. 1220, citation for silicon dioxide, 1983.*

* cited by examiner

*Primary Examiner*—Martin Angebranndt
(74) *Attorney, Agent, or Firm*—Staas & Halsey LLP (57) ABSTRACT

A method for manufacturing a master disk for forming an optical disk, including the steps of forming an $SiO_2$ film on a substrate; coating a first photoresist layer on the $SiO_2$ film; exposing the first photoresist layer according to patterns of a groove formation recess and a land formation protrusion corresponding to a groove and a land, respectively; etching the first photoresist layer and the $SiO_2$ film, to thereby form the groove formation recess and the land formation protrusion on the $SiO_2$ film; coating a second photoresist layer on the $SiO_2$ film, to thereby form the groove and the land at positions corresponding to the groove formation recess and the pit protrusion, respectively; exposing the second photoresist layer according to patterns of a pit where predetermined information is recorded; and etching the second photoresist layer, to thereby form the pits in the groove and the land.

20 Claims, 6 Drawing Sheets

MANUFACTURING METHOD OF A MASTER DISK FOR FORMING AN OPTICAL DISK, AND THE MASTER DISK

BACKGROUND OF THE INVENTION

1. Field of the Invention

The present invention relates to a method for manufacturing a master disk used for manufacturing an optical disk which is an optical recording/reproducing medium, and to the master disk.

2. Description of Related Art

Figure 1:
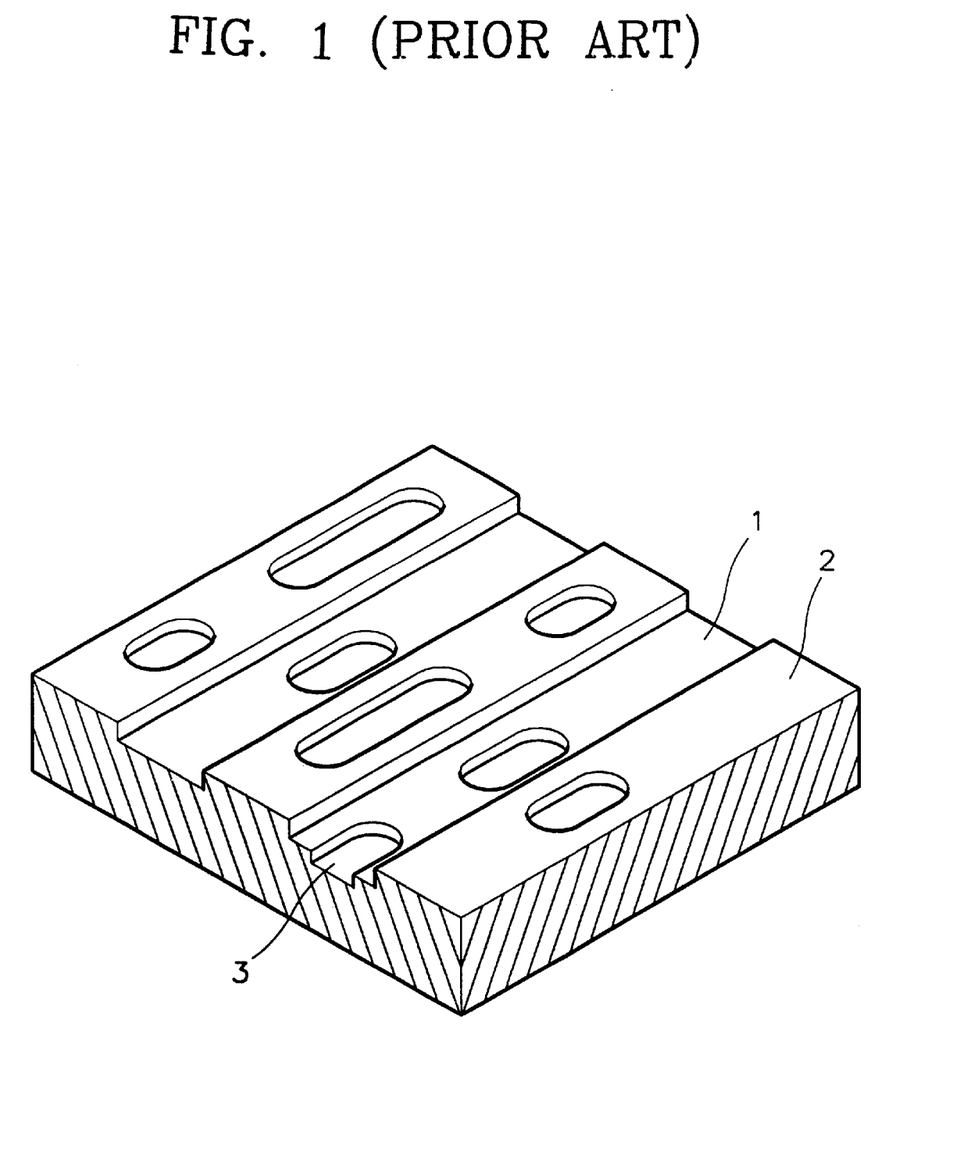
FIG. 1 is a perspective view partially showing a typical optical disk.

In general, a high density optical disk such as a digital versatile disk (DVD)—random access memory (RAM) includes grooves 1 and lands 2 where information are recorded along spiral tracks, as shown in FIG. 1. Also, pits 3 are formed on the grooves 1 and the lands 2, respectively, to thereby record desired information thereon. Since both the grooves 1 and the lands 2 are used for recording information thereon, more information can be recorded as compared to a conventional disk in which either the groove 1 or the land 2 has been used for recording.

Figure 2A:
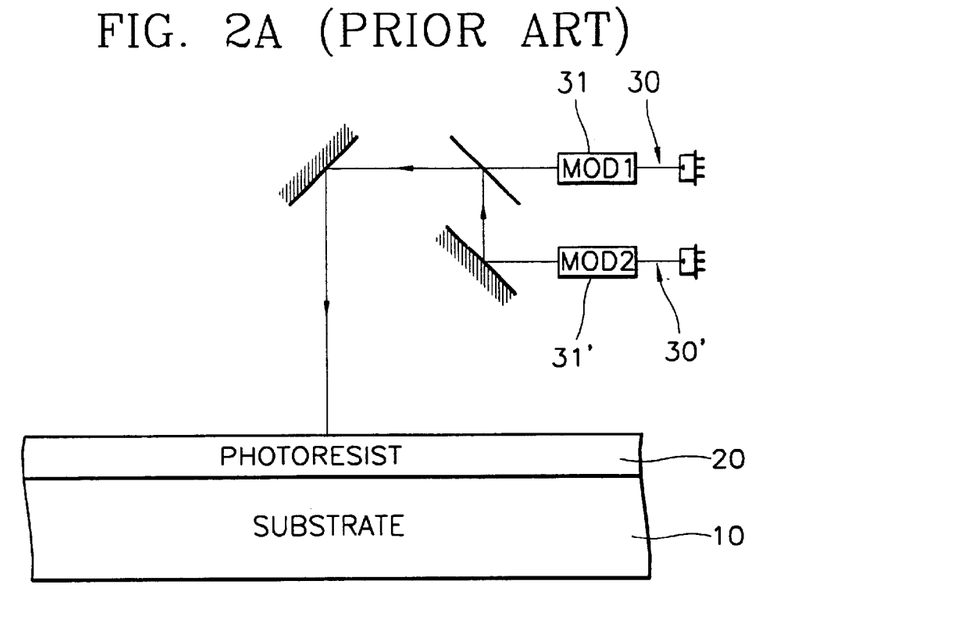
FIGS. 2A through 2D are views for illustrating processes of manufacturing the conventional optical disk shown in FIG. 1.

The optical disk is manufactured through processes as shown in FIGS. 2A through 2D. As shown in FIG. 2A, a photoresist 20 is coated on a substrate 10, and then the photoresist 20 is simultaneously exposed to a laser 30 for a groove and a laser 30' for a pit according to patterns of the groove 1, the land 2 and the pit 3 while rotating the substrate 10. Reference numerals 31 and 31' indicate modulators for turning on/off the lasers 30 and 30', respectively.

Figure 2B:
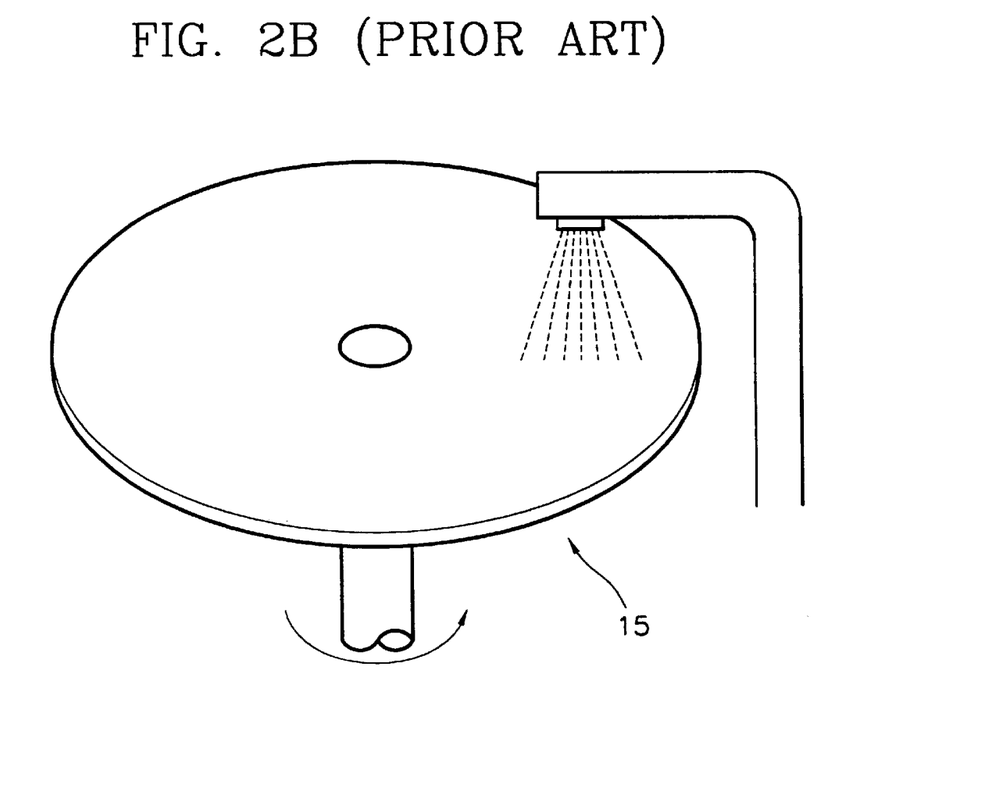

Subsequently, as shown in FIG. 2B, an etching reagent is sprayed on the exposed substrate 10, to thereby manufacture a master disk 15 where grooves, lands and pits are formed.

Figure 2C:
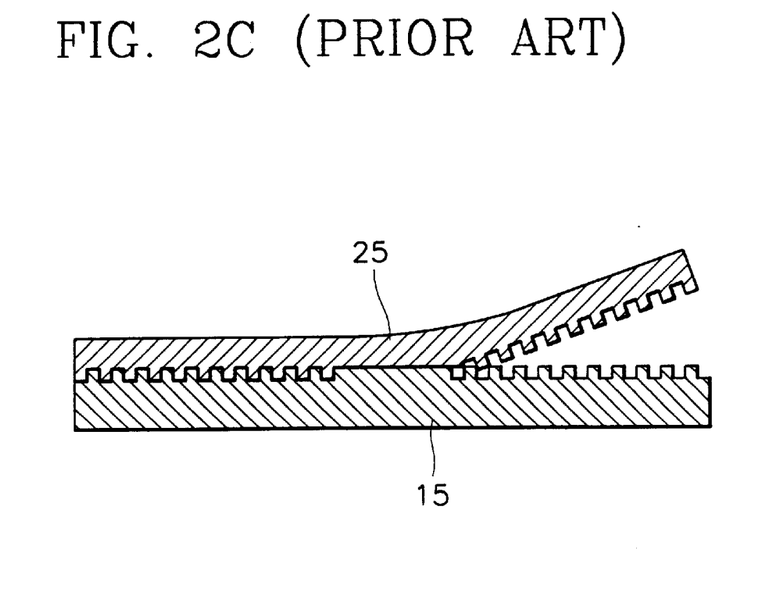
Figure 2D:
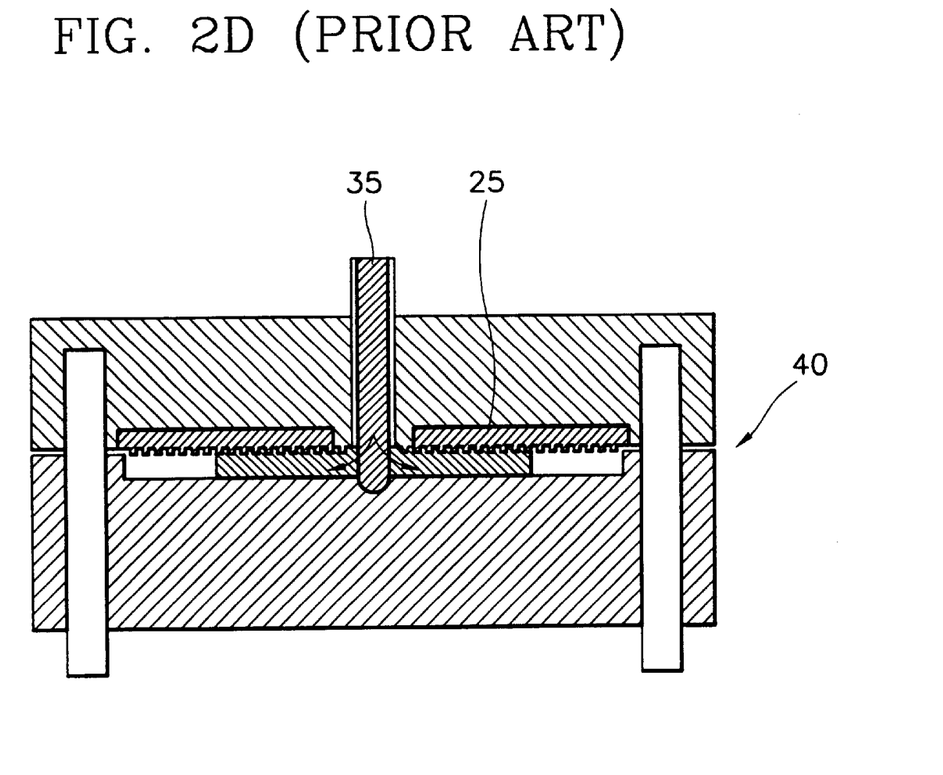
Figure 3:
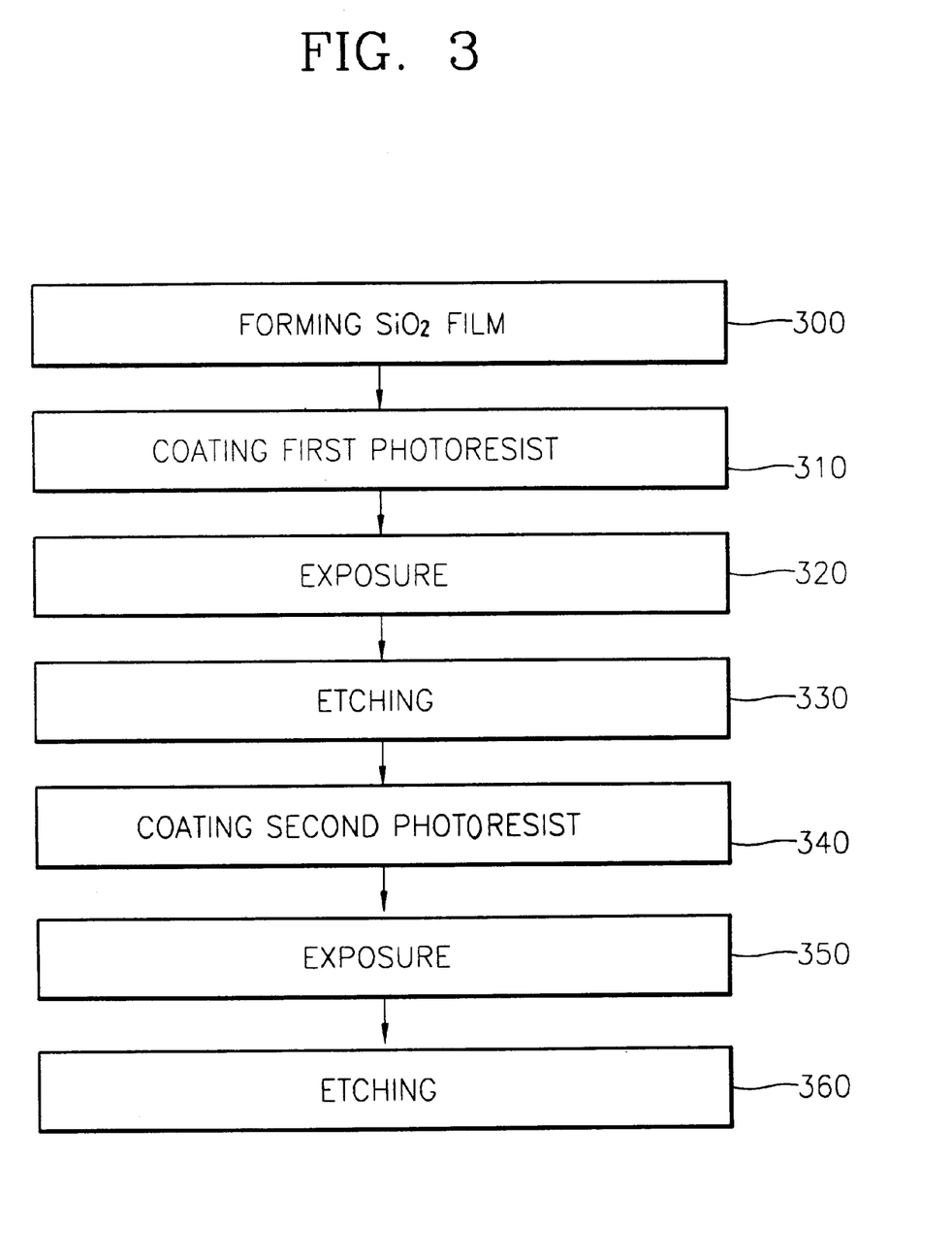
FIG. 3 is a flow chart showing a master disk manufacturing method according to an embodiment of the present invention.

A son disk 25 is formed by stamping the master disk 15 as shown in FIG. 2C, and then an optical disk is copied by an injection molding method in which resin 35 is injected into a mold 40 having the son disk 25 mounted thereon, as shown in FIG. 2D.

However, in the above method, the lands, the grooves and the pits are formed on one photoresist layer by simultaneously exposing and etching the same, so that boundaries among the land, the groove and the pit are not sharp.

Accordingly, start and end points of information signals are not accurately detected during reproduction, which may cause jitter errors in which an output signal is not appropriately generated on time.

SUMMARY OF THE INVENTION

To solve the above problems, it is an object of the present invention to provide a method for manufacturing a master disk used for forming an optical disk, by which a great deal of information is recorded at a high density and a jitter error ratio thereof is reduced.

Additional objects and advantages of the invention will be set forth in part in the description which follows and, in part, will be obvious from the description, or may be learned by practice of the invention.

Accordingly, to achieve the above and other objects of the present invention, a master disk manufacturing method of the present invention includes the steps of forming a $SiO_2$ film on a substrate; coating a first photoresist layer on the $SiO_2$ film; exposing the first photoresist layer according to a pattern of a groove formation recess and a land formation protrusion corresponding to a groove and a land, respectively; etching the first photoresist layer and the $SiO_2$ film, to thereby form the groove formation recess and the land formation protrusion on the $SiO_2$ film; coating a second photoresist layer on the $SiO_2$ film, to thereby form the groove and the land; exposing the second photoresist layer according to patterns of a pit where predetermined information is recorded; and etching the second photoresist layer, to form the pits in the groove and the land.

BRIEF DESCRIPTION OF THE DRAWINGS

The above and other objects and advantages of the present invention will become more apparent by describing in detail a preferred embodiment thereof with reference to the attached drawings in which.

DESCRIPTION OF THE PREFERRED EMBODIMENT

Figure 4:
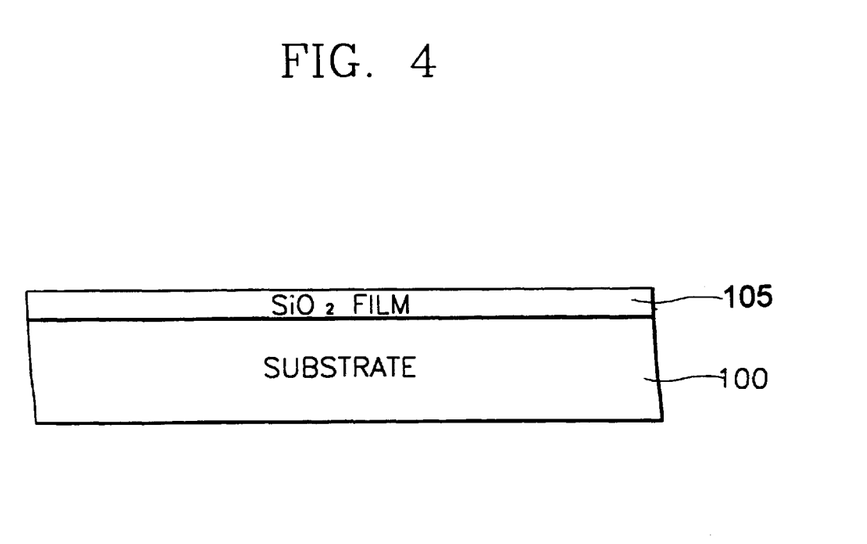
FIGS. 4 through 8 are views for illustrating varying steps in the master disk manufacturing method according to the embodiment of the present invention.

A method for manufacturing a master disk according to an embodiment of the present invention will be described with reference to FIGS. 3 through 8. First, an $SiO_2$ film 105 shown in FIG. 4 is formed on a substrate 100 through a deposition process such as sputtering in step 300. The substrate may be made out of glass.

Figure 5:
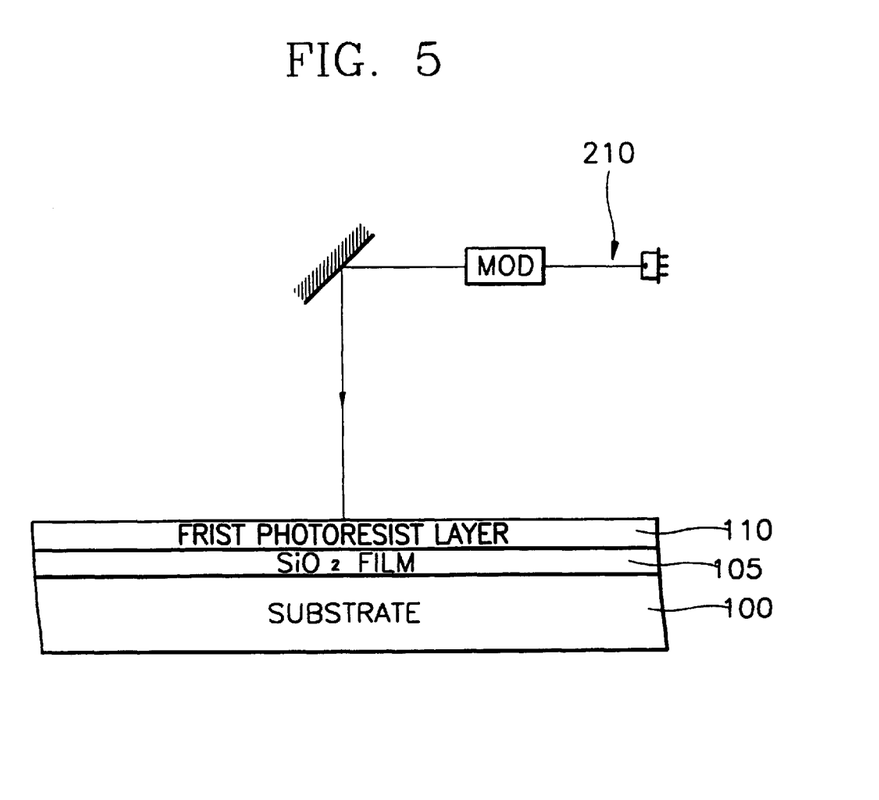

Subsequently, as shown in FIG. 5, a first photoresist layer 110 is coated on the $SiO_2$ film 105 (step 310). In step 320, the first photoresist layer 110 is exposed to a laser beam 210 while the substrate 100 is rotated. At this time, the first photoresist layer 110 is exposed in a pattern corresponding to a groove 101 (see FIG. 7) and a land 102 described later.

Figure 6:
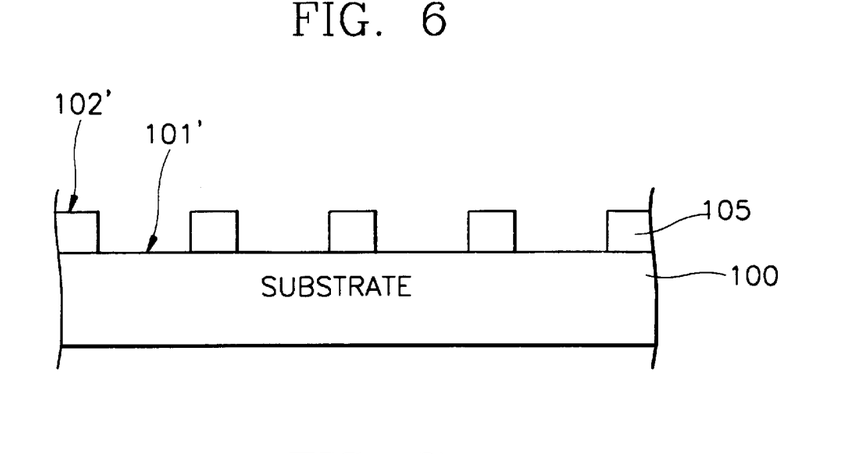

In step 330, as the exposed first photoresist layer is etched along its exposed pattern, the $SiO_2$ film 105 is etched, through a reactive ion etching method. Then, the remaining portion of the first photoresist layer 110 which is not etched is removed. Thus, as shown in FIG. 6, groove formation recesses 101' and land formation protrusions 102 ' corresponding to the grooves 101 and the lands 102 are formed on the $SiO_2$ film 105.

Figure 7:
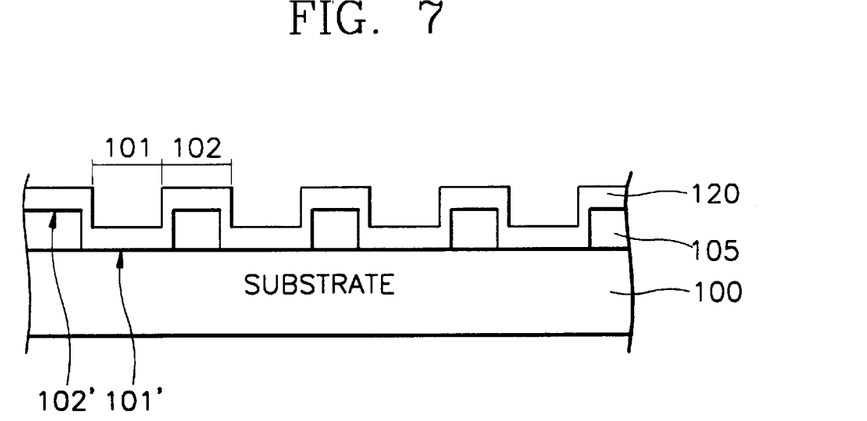

As shown in FIG. 7, a second photoresist layer 120 is coated on the $SiO_2$ film 105 and the substrate 100 (step 340). At this time, the second photoresist layer 120 is coated along surfaces of the groove formation recesses 101' and the land formation protrusions 102' with a uniform thickness. Thus, the formation of the grooves 101 and the lands 102 are completed by coating with the second photoresist layer 120.

So as to form pits, the second photoresist layer 120 is exposed to the laser beam 210 in a pattern of the pit (step 350). The pit pattern is formed in the grooves 101 and the lands 102. For example, it is possible to allow the laser beam 210 to accurately trace the grooves 102 and the lands 101 by fine-controlling a laser reflection mirror such as a galvano mirror.

Figure 8:
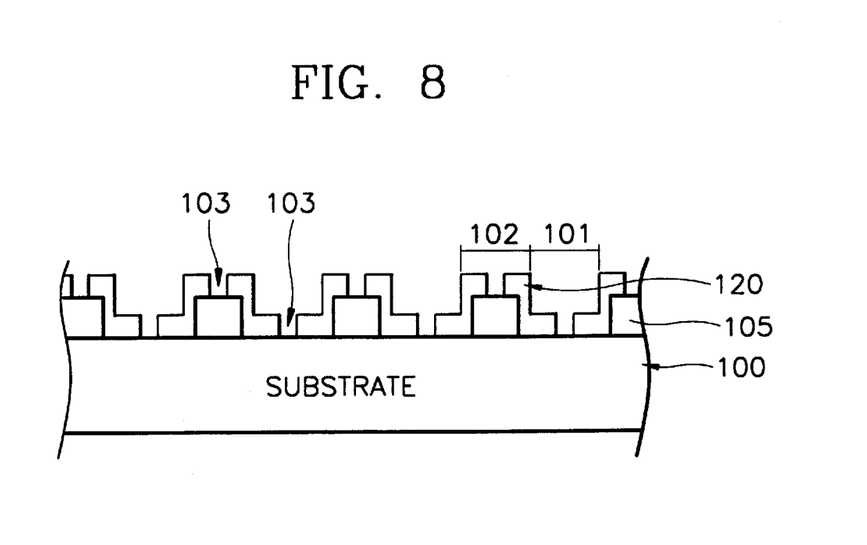

Then, the second photoresist layer 120 is etched along its exposed pattern according to the reactive ion etching method to form pits 103 in the grooves 101 and the lands 102 of the second photoresist layer 120 as shown in FIG. 8. Thus, a master disk can be obtained.

According to the present invention, the $SiO_2$ film 105 and the second photoresist layer 120 are etched through separate processes, to thereby relatively sharply form the groove, the land and the pit. An optical disk is stamped using the master disk in the aforementioned manner.

The effect of the present invention will be more apparent through an example as follows.

(EXAMPLE)

In the example, master disks (a) and (b) obtained by the conventional art have capacities of 10 Gbyte and 15.12 Gbyte, respectively. Master disks (c) and (d) manufactured by the present invention, have a groove depth of $\lambda/6\eta$ and a pit depth of $\lambda/4\eta$, where '$\lambda$' indicates a wavelength of laser for reproduction and '$\lambda$' indicates a refractive index of an optical disk produced from the master disk, and blue laser having a wavelength of 430 nm is used for exposure. Groove angles and jitter error ratios with respect to the master disks (a), (b), (c) and (d) are shown in Table 1. Here, the groove angle indicates an angle between a side surface of the groove 101 and a horizontal plane of the disk.

TABLE 1

| Master disk | Capacity | Track pitch | Groove angle | Jitter error ratio |
|---|---|---|---|---|
| (a) | 10 GB | 0.6 µm | about 50° | 15% |
| (b) | 15.12 GB | 0.4 µm | about 50° | 15~17% |
| (c) | 10 GB | 0.6 µm | about 80° | 4~6% |
| (d) | 15.12 GB | 0.4 µm | about 80° | 6~8% |

As shown in Table 1, the groove angles of the master disks (a) and (b) are approximately 50°, whereas the groove angles of the master disks (c) and (d) are approximately 80°. That is, the grooves of the master disks (c) and (d) are formed sharper than those of the master disks (a) and (b). Also, the jitter error ratio with respect to the master disk of the present invention is reduced to a half of that of the conventional jitter error ratio.

According to the master disk manufacturing method of the present invention, boundaries among the groove, the land and the pit can be sharply formed, thereby improving characteristics of information recording and reproduction and realizing high density recording of information.

What is claimed is:

1. A method of manufacturing a master disk for forming an optical disk, comprising;
    (a) forming an $SiO_2$ film on a substrate;
    (b) coating a first photoresist layer on the $SiO_2$ film;
    (c) exposing the first photoresist layer according to patterns of a groove formation recess and a land formation protrusion corresponding to a groove and a land, respectively;
    (d) etching the first photoresist layer and then the $SiO_2$ film through openings in the exposed first photoresist layer, to form the groove formation recess and the land formation protrusion in the $SiO_2$, film;
    (e) conformal coating a second photoresist layer of a uniform thickness on the $SiO_2$, film, to form the groove and the land at positions corresponding to the groove formation recess and the land formation protrusion, respectively;
    (f) exposing the second photoresist layer according to patterns to a pit where predetermined information is recorded; and
    (g) etching the second photoresist layer, to form the pits in the groove and the land.

2. The method of claim 1, wherein the groove is $\lambda/6\eta$ deep and the pits are $\lambda/4\eta$ deep, where '$\lambda$' indicates a wavelength of a reproducing laser for reproducing the optical disk formed from the master disk, and '$\eta$' indicates a refractive index of the optical disk to be formed by the master disk.

3. The method of claim 1, wherein the step (d) of etching the first photoresist layer, etching the $SiO_2$ film and the step (g) of etching of second photoresist layer are performed according to a reactive ion etching method.

4. The method of claim 1, wherein said step (d) further comprises the step of totally removing the first photoresist layer subsequent to the etching of the first photoresist layer and the $SiO_2$ film and prior to said step (e).

5. A method of manufacturing a master disk, comprising:
    (a) forming an $SiO_2$ film on a substrate;
    (b) forming a groove formation recess and a land formation protrusion corresponding to a groove and a land, respectively, in the $SiO_2$, film;
    (c) forming a first photoresist layer in a conformal manner and of uniform thickness on the $SiO_2$, film having the groove formation recess and the land formation protrusion;
    (d) exposing the first photoresist layer according to patterns of a pit which record information; and
    (e) etching the first photoresist layer to form the pits in the groove and the land.

6. The method of claim 5, wherein said step (b) comprises the steps of:
    (b1) forming a second photoresist layer on the $SiO_2$ film;
    (b2) exposing the second photoresist layer in patterns of the groove formation recess and the land formation protrusion; and
    (b3) etching the second photoresist layer and the $SiO_2$ film to form the groove formation recess and the land formation protrusion.

7. The method of claim 6, wherein said step (b3) further comprises the step of etching an exposed portion of the $SiO_2$ film subsequent to the etching of the second photoresist layer, and then totally removing the second photoresist layer.

8. The method of claim 6, wherein said step (c) comprises the step of forming the first photoresist layer along surfaces of the groove formation recess and the land formation protrusion with a uniform thickness.

9. The method of claim 6, wherein said step (d) comprises the step of radiating a laser beam on the first photoresist layer to expose the first photoresist layer.

10. The method of claim 6, wherein said step (d) comprises the step of radiating a laser beam on the first photoresist layer to expose the first photoresist layer, and said step (b2) comprises the step of radiating the laser beam on the second photoresist layer to expose the second photoresist layer.

11. The method of claim 5, wherein said step (c) comprises the step of forming the first photoresist layer along surfaces of the groove formation recess and the land formation recess with a uniform thickness.

12. The method of claim 5, wherein said step (d) comprises the step of radiating a laser beam on the first photoresist layer to expose the first photoresist layer.

13. The method as claimed in claim 5, wherein the groove is $\lambda/6\eta$ deep, '$\lambda$' indicates a wavelength of a reproducing laser and 'η' indicates a refractive index of an optical disk to be produced from the master disk, and the pits are $\lambda/4\eta$ deep.

14. A master disk, comprising:

a substrate;

an $SiO_2$ film formed on said substrate and having a groove formation recess and a land formation protrusion; and a photoresist layer conformably coated in a uniform thickness along surfaces of the groove formation recess and the land formation protrusion to form a groove and a land, wherein said photoresist layer has pits at locations extending to the groove formation recess and the land formation protrusion, to form the pits in the groove and the land.

15. The master disk as claimed in claim 14, wherein the groove is $\lambda/6\eta$ deep, 'λ' indicates a wavelength of a reproducing laser and 'η' indicates a refractive index of an optical disk to be produced from the master disk, and the pits are $\lambda/4\eta$ deep.

16. The master disk as claimed in claim 15, wherein a groove angle of the groove is approximately 80 degrees.

17. The master disk as claimed in claim 15, wherein a jitter ratio with respect to the master disk is between 4 and 8%.

18. The master disk as claimed in claim 14, wherein a groove angle of the groove is approximately 80 degrees.

19. The master disk as claimed in claim 14, wherein a jitter ratio with respect to the master disk is between 4 and 8%.

20. The master disk as claimed in claim 14, wherein said substrate is glass.

* * * * *

UNITED STATES PATENT AND TRADEMARK OFFICE
CERTIFICATE OF CORRECTION

PATENT NO.   : 6,242,162 B1
DATED        : June 5, 2001
INVENTOR(S)  : Myoung-do Ro et al.

It is certified that error appears in the above-identified patent and that said Letters Patent is hereby corrected as shown below:

<u>Column 4,</u>
Line 7,   "$\eta$" should be -- $\eta$ --;
Line 26,   "SiO2, film" should be -- $SiO_2$ film --;
Line 46, "6" should be -- 5 --;

<u>Column 5,</u>
Line 2, "$\eta$" should be -- $\eta$ --;

<u>Column 6,</u>
Line 3, "$\eta$" should be -- $\eta$ --.

Signed and Sealed this

Twenty-sixth Day of February, 2002

*Attest:*

JAMES E. ROGAN
*Attesting Officer*   *Director of the United States Patent and Trademark Office*